United States Patent [19]
Matheny

[11] Patent Number: 6,129,195
[45] Date of Patent: Oct. 10, 2000

[54] BALL TRANSFER DECK AND PIN STOP THEREOF

[75] Inventor: Douglas R. Matheny, Mount Washington, Ky.

[73] Assignee: Ziniz, Inc., Louisville, Ky.

[21] Appl. No.: 09/256,431

[22] Filed: Feb. 23, 1999

[51] Int. Cl.[7] .................................................. B65G 13/00
[52] U.S. Cl. .................................. 193/35 MD; 193/35 A
[58] Field of Search ............................. 193/35 MD, 35 A

[56] References Cited

U.S. PATENT DOCUMENTS

| | | | |
|---|---|---|---|
| 3,739,894 | 6/1973 | Hinman | 193/35 MD |
| 4,036,345 | 7/1977 | Webb | 193/35 MD X |
| 4,397,386 | 8/1983 | Kampf | 193/35 A X |
| 4,706,793 | 11/1987 | Masciarelli | 193/35 A |

*Primary Examiner*—James R. Bidwell
*Attorney, Agent, or Firm*—Stites & Harbison, PLLC; David W. Nagle, Jr.; Vance A. Smith

[57] ABSTRACT

A ball transfer deck facilitates movement of heavy loads across the deck over an array of ball transfer units while reducing attendant operating noise. An annular elastomeric sleeve isolates the upper flange of each individual ball transfer unit from direct contact with the deck, thereby reducing noise generated by the contact between the ball transfer unit and deck. An associated pin stop mechanism is also installed in the ball transfer deck and can be selectively engaged to prevent the movement of a particular load across the deck. To decrease the probability of damage to the deck and increase the stability and strength of the pin stop mechanism, the preferred pin stop mechanism includes a wide upper flange that allows the pin stop mechanism to be easily attached to an upper surface to the deck. Moreover, in an effort to further increase strength and stability, the pin stop mechanism may also be equipped with a second lower flange that is attached to the lower surface of the deck in alignment with the upper flange to allow for attachment of the upper and lower flanges by common fasteners.

15 Claims, 3 Drawing Sheets

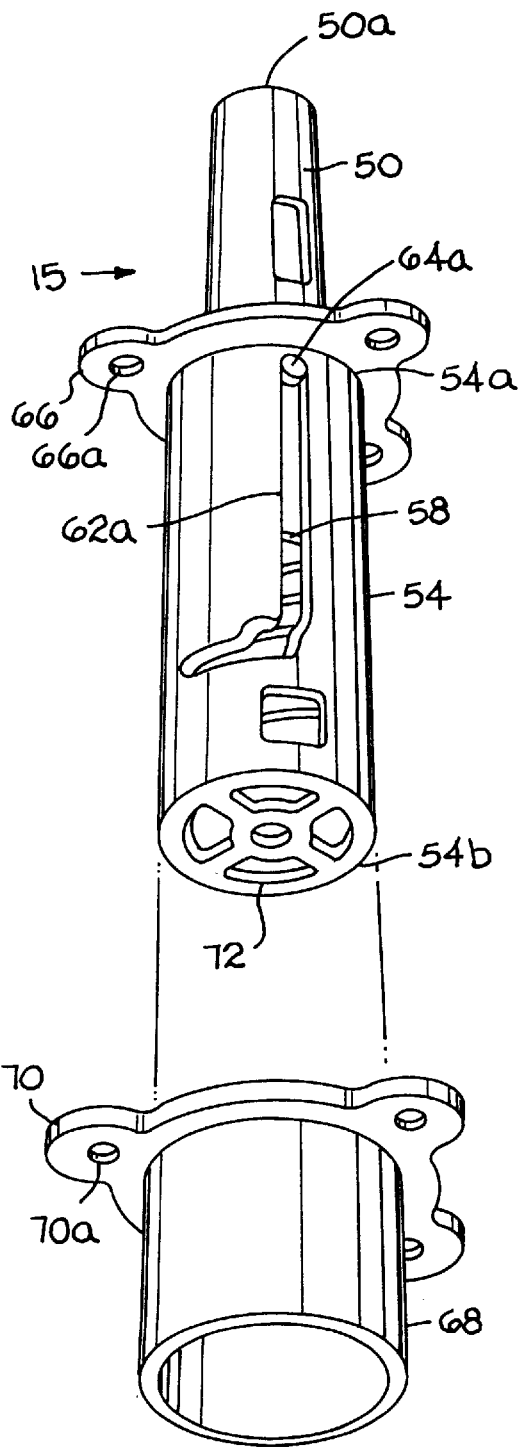
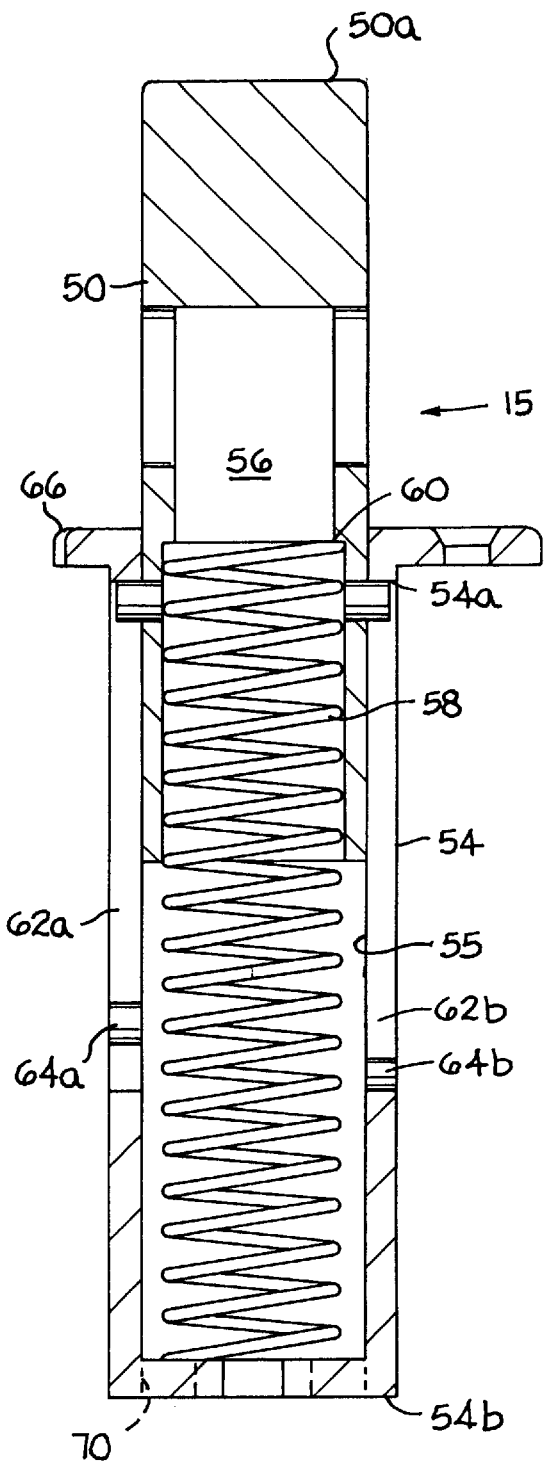
FIG. 5
FIG. 6

BALL TRANSFER DECK AND PIN STOP THEREOF

BACKGROUND OF THE INVENTION

The present invention relates to a ball transfer deck that facilitates movement of heavy loads and an associated pin stop mechanism installed in the ball transfer deck that can be selectively engaged to prevent the movement of a particular load across the load-bearing support surface of the deck.

Ball transfer decks are commonly used in air cargo and other material handling industries to move heavy loads such as cargo containers. Typically, a ball transfer deck comprises a series of ball transfer units (BTUs) installed in openings in a generally horizontal support surface. Each BTU has a ball or roller contained in a housing with the ball being freely rotatable with respect to the housing. Each BTU is installed such that the roller projects above the support surface. The ball contacts a portion of the bottom surfaces of the loads being conveyed along the deck. Proper placement of the BTUs along the deck ensures that the loads do not contact the support surface of the deck itself but contact only the balls of the BTUs. Loads are thus easily moved either manually or mechanically over the BTUs.

A variety of BTUs have been developed in the prior art in an effort to improve the performance of the BTUs and/or to extend the life of the BTUs. See, for example, U.S. Pat. Nos. 5,540,314 and 5,464,086 issued to Coslin. Still, the basic structure of most BTUs is essentially the same, generally comprising a cylindrical sleeve with an upper flange that houses a ball roller. The sleeve is inserted through an opening in the surface of the deck with the upper flange of the BTU abutting the upper surface of the deck, thereby preventing the BTU from being pushed through the deck under the weight of the conveyed loads. This simple construction also allows for the rapid removal and replacement of damaged BTUs.

Despite improvements in BTU design and construction, a problem that still persists in relation to typical ball transfer decks is the intense noise that often results from the rapid movement and conveyance of loads over the surface of the BTUs. Thus, it is a paramount object of the present invention to provide for a simple construction of BTUs that will reduce attendant operating noise while not increasing manufacturing costs or adding undue complexity to the design of the BTU.

The present invention also seeks to address typical problems associated with stopping the movement of loads across prior art ball transfer decks. When conveying cargo containers or other loads across a ball transfer deck, it is often necessary to stop movement of a particular load or to maintain a particular load in a stationary position despite movements of other loads. To accomplish this, pin stop mechanisms are often incorporated into the ball transfer deck. A pin stop mechanism is generally comprised of a steel post or pin that is spring loaded into a sleeve. The mechanisms are preferably constructed so that they will slide into the same openings in which the BTUs are positioned. In a first position, the pin of the pin stop mechanism is in a recessed position, i.e., housed within the sleeve below the level of the conveying surface defined by the rollers of the BTUs. When it is necessary to stop movement of a load across the deck, the pin is extended into a second position in which the distal end of the pin projects above the level of the BTUs, thereby preventing movement of a load over the deck.

Such prior art pin stops, however, have attendant disadvantages. For example, typical prior art pin stop mechanisms are frequently damaged by the repeated impacts of conveyed loads against the extended pins. In some instances, these impacts may cause a pin to lean laterally, thereby damaging the edge of the associated opening in the ball transfer deck. Not only might this cause the pin stop mechanism to fall through the ball transfer deck when the load is released, but such damage to the openings in the ball transfer deck also makes it difficult to replace the damaged pin stop mechanism. Thus, it is another important object of this present invention to provide for a ball transfer deck in which the pin stop mechanisms better withstand the repeated impacts of heavy loads against the pins, thereby preventing damage to the pin stop mechanisms and associated openings in the deck surface.

These and other objects and advantages of the present invention will become apparent upon a reading of the following description and appended claims.

SUMMARY OF THE INVENTION

The present invention is ball transfer deck and associated pin stop mechanism. The ball transfer deck of the present invention facilitates movement of heavy loads across the deck over an array of ball transfer units. Unlike prior art ball transfer decks, the attendant operating noise common to such movement of heavy loads is significantly reduced through the incorporation of annular, elastomeric sleeves that isolate the upper flange of each individual ball transfer unit from direct contact with the deck. The associated pin stop mechanism is also installed in the ball transfer deck and can be selectively engaged to prevent the movement of a particular load across the load-bearing support surface of the deck. To decrease the probability of damage to the deck and increase the stability and strength of the pin stop mechanism, the preferred pin stop mechanism includes a wide upper flange that allows the pin stop mechanism to be easily attached to an upper surface to the deck. Moreover, in an effort to further increase strength and stability, the pin stop mechanism may also be equipped with a second lower flange that may be attached to the lower surface of the deck in alignment with the upper flange to allow for attachment of the upper and lower flanges by common fasteners.

BRIEF DESCRIPTION OF THE DRAWING

FIG. 5 is a perspective view of the pin stop mechanism of FIG. 4; and

FIG. 6 is a side sectional view of the main body of the pin stop of FIG. 5.

DETAILED DESCRIPTION OF THE PREFERRED EMBODIMENT

Figure 1:
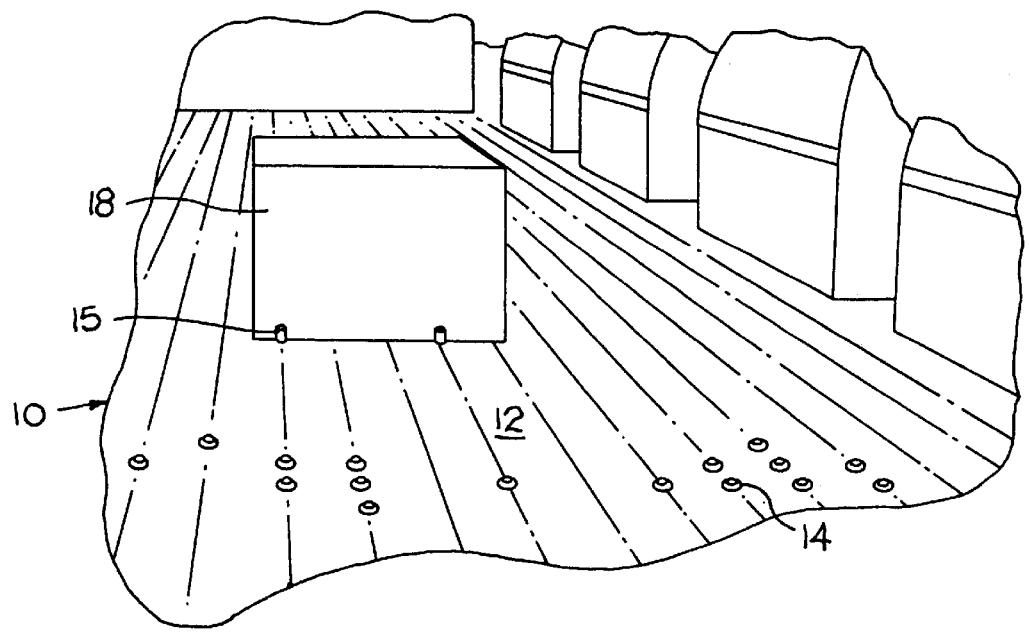
FIG. 1 is a perspective view of a ball transfer deck in accordance with the present invention depicting the placement and usage of two preferred pin stop mechanisms.

In FIG. 1, a ball transfer deck, referred to generally by the character numeral 10, is depicted as having a load-bearing support surface 12, or deck, that defines a plurality of openings for accommodating an array of ball transfer units 14. These BTUs 14 are interspersed with pin stop mechanisms 15, two of such pin stop mechanisms 15 being shown in an extended position. In this extended position, the pin stop mechanisms 15 effectively prevent movement of a load 18 across the deck 12 in a direction out of the plane of the FIG. 1.

Figure 2:
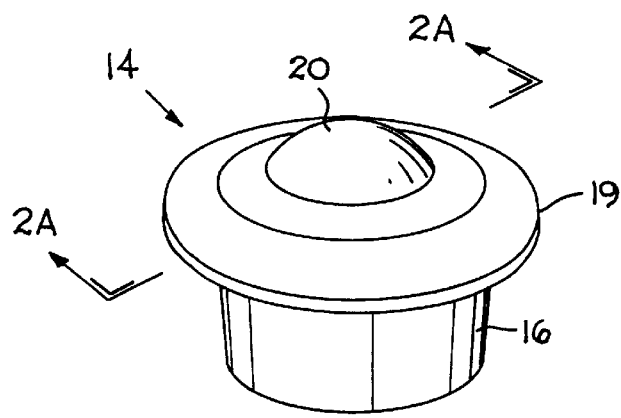
FIG. 2 is a perspective view of a ball transfer unit that is installed in the ball transfer deck of FIG. 1.
Figure 2A:
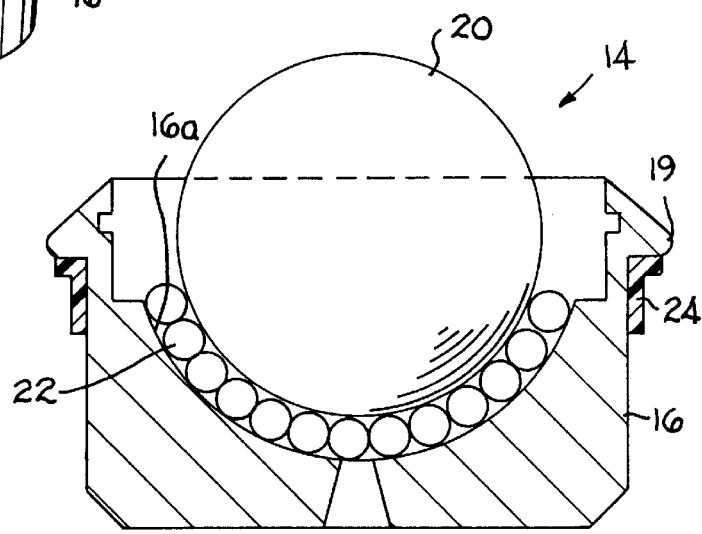
FIG. 2A is a cross sectional view taken along lines 2A—2A of FIG. 2 showing the elastomeric sleeve that is installed into the deck along with each ball transfer unit.

FIG. 2 illustrates, in perspective, a preferred ball transfer unit 14 that is installed in a deck 12 in accordance with the present invention. This ball transfer unit 14 has a housing 16 with a horizontally projecting flange member 19 adapted to be juxtaposed adjacent the upper surface of load-bearing deck 12. A spherically-shaped roller 20 is secured within this housing 16. The side sectional view of FIG. 2A shows that the housing 16 has a concave-shaped inside surface 16a supporting a plurality of metal roller bearings 22. These roller bearings 22 provide a support surface for the roller 20 of the ball transfer unit 14. As shown in FIG. 2A, the flange member 19, when installed in a deck 12, is isolated from direct contact with the upper surface of the deck 12 by an annular, elastomeric sleeve 24. The isolation of the housing 16 from the deck 12 in this manner substantially reduces the noise that results when a load is moved across the deck 12.

Figure 3:
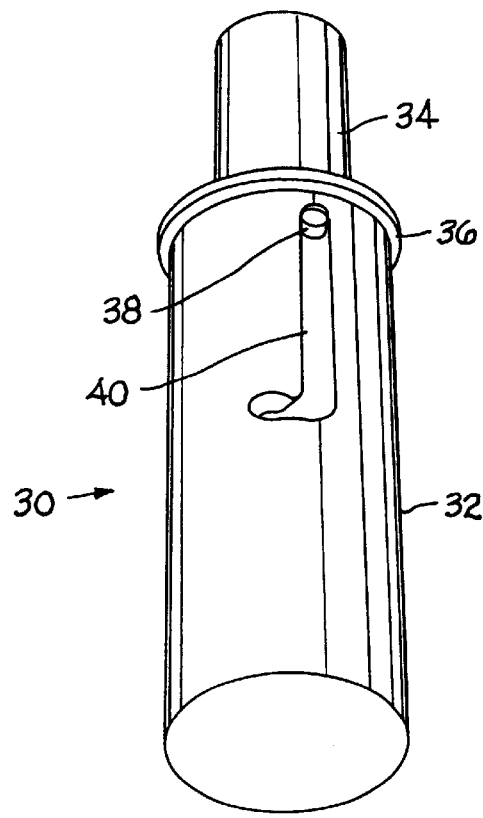
FIG. 3 is a perspective view of a typical pin stop mechanism used with prior art ball transfer decks.

FIG. 3 shows is a typical prior art pin stop mechanism. Such a mechanism, referred to generally by character numeral 30, has a sleeve 32 that receives a pin member 34. This sleeve 32 is secured to the transfer deck (not shown in this Figure) by a small flange member 36. The pin member 34 has a finger 38 which extends through a groove 40 in the wall of sleeve 32. The pin member 34 is biased into the extended position, as shown in FIG. 3, by some biasing mechanism, such as a spring, housed within the sleeve 32. To retract the pin member 34 so as not to impede movements of loads over the deck 12 and across the position of the pin stop mechanism 30, the pin member 34 is forced down into the sleeve 32 against the biasing mechanism and rotated so that the finger 38 is in the lower portion of the groove 40. At this point, the pin member 34 is effectively locked into a retracted position. While effective as a stop against loads, this pin stop mechanism 30 often causes damage to the opening in the deck 12 in which it is installed due to repeated load impacts. This may cause the pin stop mechanism 30 to lean with respect to the deck surface 12. When replacement of the pin stop mechanism 30 is required, the damage to the pin stop mechanism 30 and associated opening in the deck makes it difficult to disassemble and replace the pin stop mechanism 30.

Figure 4:
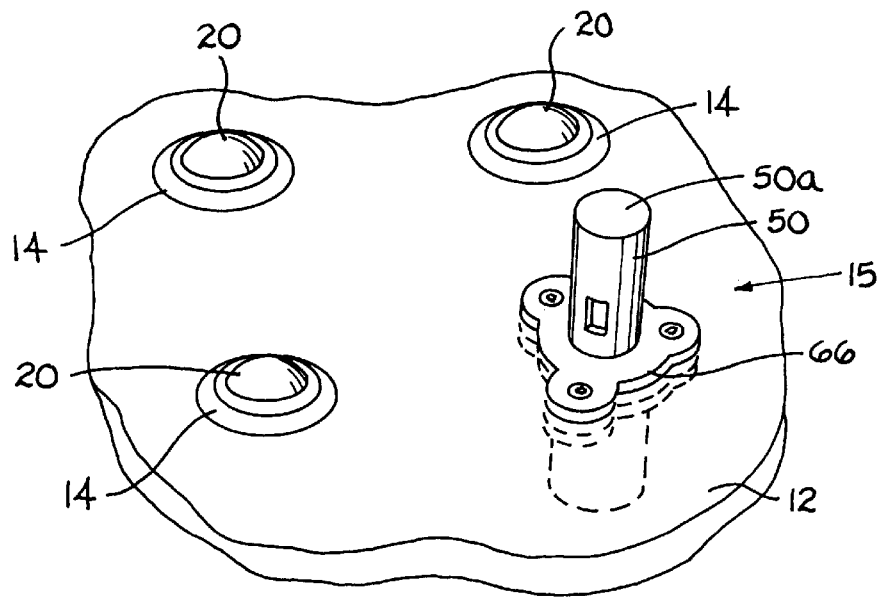
FIG. 4 is a perspective of a pin stop mechanism installed in a ball transfer deck in accordance with the present invention.

FIG. 4 shows a pin stop mechanism 15 in accordance with the present invention secured to the surface of a load-bearing deck 12 among a plurality of BTUs 14. This pin stop mechanism 15 has a pin 50 that is shown in an extended position, the distal end 50a of the pin 50 projecting above a load-carrying plane collectively defined by the rollers 20 of the BTUs 14. The details of the pin stop mechanism 15 are best seen in the views provided by FIGS. 5 and 6. The pin 50 is movably housed within a sleeve 54 that has an open top end 54a and a substantially closed bottom end 54b. The pin 50 slides along the inner surface 55 of sleeve 50. The pin 50 has an internal channel 56 into which a helical compression spring 58 projects. This spring 58 abuts the bottom end 54b of the sleeve 50 and a flange 60 formed by a reduction in the internal diameter of channel 56, thus urging the pin 50 upward away from the bottom end 54b. It is also important to note that, in this preferred embodiment, the bottom end 54b of the sleeve 50 defines a plurality of openings 72 that allow for the passage of water and other contaminants through the sleeve 50. In the absence of such openings, accumulated water, for example, could freeze and cause the sleeve to crack or fracture. Contaminants could also interfere with the vertical movement of the pin 50 and/or compression of the spring 58.

The pin 50 is preferably locked into the retracted position using the well-known expedient of a tongue-and-groove locking mechanism. As best illustrated in FIG. 5, the sleeve 50 defines a pair of slots or grooves 62a, 62b, and the pin 50 has a pair of followers or fingers 64a, 64b that project into these grooves 62a, 62b. Each groove 62a, 62b is configured so that when the fingers 64a, 64b of the pin 50 reach the bottoms of the respective grooves 62a, 62b, and the pin 50 is rotated slightly, the fingers 64a, 64b, and thus the pin 50, are locked into position against the upward biasing force of the spring 58. Although the pin stop mechanism shown and described includes two grooves 62a, 62b and associated fingers 64a, 64b, only one such groove 62 and finger 64 is necessary to lock the pin 50 into place.

The sleeve 54 also has a flange plate 66 that projects outward from the sleeve and is positioned over the upper surface of the deck 12, as is best illustrated in FIG. 4. The pin stop mechanism 15 may also be provided with a second sleeve 68 that also has a flange plate 70 that projects outwardly from the sleeve so that it may be positioned against the lower surface of deck 12 as shown in dashed lines of FIG. 4. Each of the flange plates 66, 70 have respective openings 66a and 70a that are in registry when the two sleeves are properly positioned with respect to the deck 12. Appropriate fasteners, such as bolts, can be used to secure the plates 66, 70 to the deck 12 and each other. The lower second sleeve 68 has an internal diameter greater than the external diameter of sleeve 54 so that sleeve the first 54 is partially enclosed within the second sleeve 68 when installed in the deck 12. The use of a second sleeve 68 in this manner provides significantly increased strength against the lateral movement of the pin 50 due to the frequent and cumulative impact of the loads. Furthermore, the use of such a second sleeve 68 facilitates replacement of a pin stop mechanism 15 into a damaged opening in the deck 12. The flange plates 66, 70 of the upper and lower sleeves 54, 68 can be effectively secured to one another so that a tight fit between the pin stop mechanism 15 and opening into which it is installed is not necessary.

It will be obvious to those skilled in the art that other modifications may also be made to the embodiments described above without departing from the spirit and scope of the present invention.

What is claimed is:

1. A ball transfer deck having pin stops for selectively preventing movement of a load across the deck comprising:
   a substantially horizontal, load-bearing deck defining a surface and a multiplicity of regularly spaced circular first openings and a lesser number of spaced second openings;
   a plurality of cylindrically-shaped housings positioned in said first openings, each of said housings having a concavity adapted to receive a plurality of roller bearings about a surface defining said concavity;
   load-bearing roller balls positioned for universal rotation within said housings and defining a horizontal load-bearing plane;
   annular elastomeric sleeves positioned about said housings between said housings and said deck surface, thereby isolating said housings from direct contact with said deck surface and minimizing vibration and reducing noise as loads are moved over said roller balls; and pin stop mechanisms with pin housings positioned within said second openings, said pin stop mechanisms having pins movable with respect to the horizontal plane between a first position in which the pins project above the horizontal plane to prevent movement of a load through said pin stop mechanisms and a second position in which said pins are retracted below the horizontal plane allowing movement of a load over said pin stop mechanisms.

2. The deck of claim 1 in which each of said pin stop mechanisms has a first flange plate, said first flange plate projecting horizontally out over and secured to a top surface of said load-bearing deck.

3. The deck of claim 2 in which each of said pin stop mechanisms has a second flange plate, said second flange plate projecting horizontally out below and secured to a bottom surface of said load-bearing deck, said first and second flange plates cooperating to minimize movement of said pin housings due to impacts of loads against said pins when in said first position.

4. The deck of claim 3 in which each of said pin stop housings has a vertically disposed channel with an open top end and a bottom end, each channel enclosing a respective one of said movable pins, each of said pins being biased into said first position.

5. The deck of claim 4 in which each of said pin stop housings has a first sleeve defining said channel, said first sleeve defining a locking groove and each of said pins having a locking member projecting therefrom into said groove, said groove configured to lock said pin in said second position when said pin is depressed downwardly and rotated in a predetermined direction.

6. The deck of claim 5 in which a spring is positioned in each of said channels between said pin and said bottom end of the channel, thereby biasing said pin upward into said first position.

7. The deck of claim 6 in which each of said bottom ends defines a plurality of openings through which water and other contaminants may pass out of said pin housings.

8. The deck of claim 7 in which each of said pin mechanisms includes an annular second sleeve open at top and bottom ends thereof, said first flange plate being secured to said first sleeve about said top end opening thereof and said second flange plate being secured to said second sleeve about the top end opening thereof, said second sleeve having an internal diameter greater than said first sleeve and being positioned about said first sleeve.

9. The deck of claim 8 in which each of said first and second flange plates define a plurality of openings for receiving fasteners, said openings of said first and second flange plates being in registry so that said plates are secured to said deck by common fasteners.

10. In a ball transfer deck having a multiplicity of spaced ball transfer units secured to a load-bearing deck and having associated spherical rollers collectively defining a substantially horizontal load-bearing surface, and a plurality of pin stop mechanisms, each having a pin movable between a first position in which a distal end of said pin projects above the load-bearing surface and a second position in which the distal end of said pin is retracted below the load-bearing surface, an improved pin stop mechanism having a first flange plate and a second flange plate, said first flange plate projecting horizontally out over and secured to a top surface of said load-bearing deck, and said second flange plate projecting horizontally out below and secured to a bottom surface of said load-bearing deck, thereby minimizing movement of said pin stop mechanism due to impacts of loads against said pin when in said first position.

11. The improved stop pin mechanism of claim 10 including vertically disposed first and second sleeves, said first sleeve having an open top end, a substantially closed bottom end, and housing said pin, said first flange plate being secured to said first sleeve about said top end, said second sleeve being open at a top end thereof and having an internal diameter greater than said first sleeve, said second flange plate being secured to said second sleeve about the top end thereof, and said first sleeve being partially positioned within said second sleeve.

12. The improved pin stop mechanism of claim 11 including a biasing spring positioned within said first sleeve and abutting said enclosed bottom end thereof and said pin, thereby biasing said pin into said first position.

13. The improved pin stop mechanism of claim 12 in which said first sleeve defines a groove and said pin has a finger projecting through said groove, said groove being configured to retain said finger in a fixed position when said pin is depressed downward against said spring and rotated in a predetermined direction thereby maintaining said pin in said second position.

14. A pin stop for use in ball deck transfer deck for selectively preventing movement of a load across the ball deck transfer deck comprising:

a first sleeve having an open top end and a substantially closed bottom end;

a first flange plate member secured to said first sleeve about the top end thereof;

a movable pin biasly mounted within said first sleeve for movement between an extended position and a retracted position;

a second sleeve having an open top end and bottom end thereof and having an internal diameter larger than an outer diameter of said first sleeve, and second sleeve adapted to receive at least a portion of said first sleeve.

15. The pin stop of claim 14 in which said first sleeve defines a groove and said pin has a finger that projects through said groove, said groove configured to lock said finger into a stationary position and said pin in said retracted position when said pin is depressed into said first sleeve and rotated in a predetermined direction.

* * * * *